Dec. 19, 1933.   J. G. BRITTAIN   1,940,291
COLLAR SUPPORT
Filed Jan. 5, 1931   2 Sheets-Sheet 1

INVENTOR
John G. Brittain
BY
ATTORNEY

Dec. 19, 1933.   J. G. BRITTAIN   1,940,291
COLLAR SUPPORT
Filed Jan. 5, 1931   2 Sheets-Sheet 2

INVENTOR
BY John G. Brittain
ATTORNEY

Patented Dec. 19, 1933

1,940,291

UNITED STATES PATENT OFFICE 1,940,291

COLLAR SUPPORT

John G. Brittain, Walla Walla, Wash.

Application January 5, 1931. Serial No. 506,702

4 Claims. (Cl. 223—18.6)

This invention relates to collar supports, more particularly such as may be used by laundrymen, or for shipping or packing, and has as one of its objects to provide a collar support that is adapted to maintain the collar of a shirt in its fresh, smooth and ironed state.

Another object of the invention is to provide a collar support that will prevent the collar from being crushed to form a permanent crease on each of its sides.

A further object of the invention is to provide a collar support that may be formed integral by stamping and that is adapted for use with a folder.

A further object of the invention is to provide a collar support that will support the front and back of the collar of a shirt simultaneously.

A further object of the invention is to provide a collar support having a rigid front and back support that will maintain the original and natural shape of the collar by rigidly securing the front and back the proper spaced relation with each other.

With these and other objects in view reference is now had to the accompanying drawings in which Fig. 1 is a perspective view of a fragment of a bosom board showing its adaptability for association with a folder and showing one form of collar front and back support;

Figure 1:
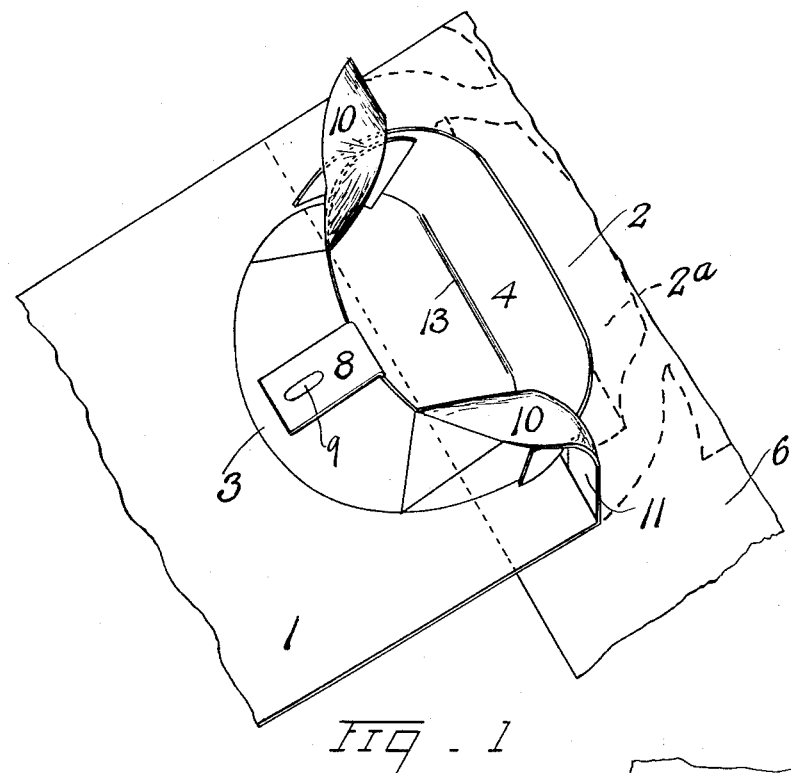

Having reference to the drawings like numerals refer to like parts throughout the several views and the numeral 1 refers to a bosom board to which is attached, or formed integral with, a collar support 2.

The bosom board 1 is of the usual shape and material, the longitudinal dimensions however obviously being greater to provide material from which to produce cut-outs 2a for the collar supports, cutting being accomplished in any suitable manner, as by dies.

While the collar support 2 is preferably cut from the board to form it integral therewith, it is obvious that it may be made separate and attached later thereto if deemed advisable, in which case the board will be sized to accommodate the addition.

The collar support consists of two major parts a collar front support 3, and a collar rear support 4, and these are folded, in a manner to be described, to stiffen the collar, support it, protect its curvature and secure the collar 4a to the board 1 whereby to prevent longitudinal movement of the shirt 4b to which the collar is attached, and to secure the collar end of the shirt against lateral movement, thus, with a band 5 or folder 6 to be explained, securing the entire shirt to the board 1.

The collar front support 3 is intended to fit inside the collar 4a adjacent and conforming to the natural circular form of the front of the collar when buttoned, that is providing for the collar a continuous curvature as assumed when buttoned on the wearer, and this support consists of the front collar piece 3, preferably divided into halves forming separate wings 7, in which case a tab piece 8 containing a button hole 9 may be provided interposed between the two wings in a position convenient to engage the neck button not shown of the shirt.

The front collar piece 3 may be of a single piece as shown in Fig. 1, in which case it is connected with the board by two securing arms 10, these arms acting as braces that by resting on the top edge of the collar help secure the front collar support in place and maintain the collar rigid.

In the case of my preferred form however a single securing arm 10 unites with and joins the two wings and by this method of construction the securing arm is broader and thus provides greater strength to hold the front collar piece in place.

In the first instance the uprights 11 of the securing arms will rest against the sides of the collar at the point of laterally opposite sides, the natural point of break-down when pressure comes upon the front of the collar, and these uprights have ample strength, positioned edgewise with relation to the collar, to withstand such a pressure.

In my preferred form the breadth of the securing arm 10, where it joins the wings, holds the wings firmly against the collar and the short projections 12 of the wings, being supported so near the point of break-down, will amply support the collar at these opposite points.

In both designs the tab 8, when attached to the button of the shirt, will, by folding completely over the collar act to combine the collar and the support as a unified structure, with the obvious added strength.

Parallel lines, having the indicating character 13 represent a score upon which to make the necessary bends to shape the collar front support to fit the finished collar but obviously these may be omitted in certain places if deemed desirable.

Figure 2:
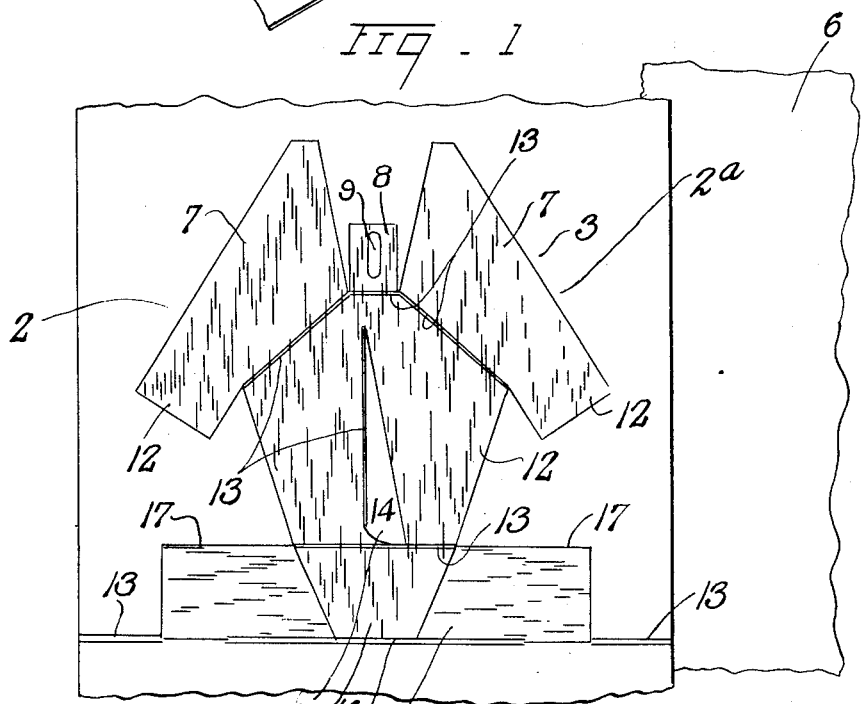
Fig. 2 is a plan view of a fragment of a bosom board showing my preferred form of collar front and back support, in the flat.
Figure 3:
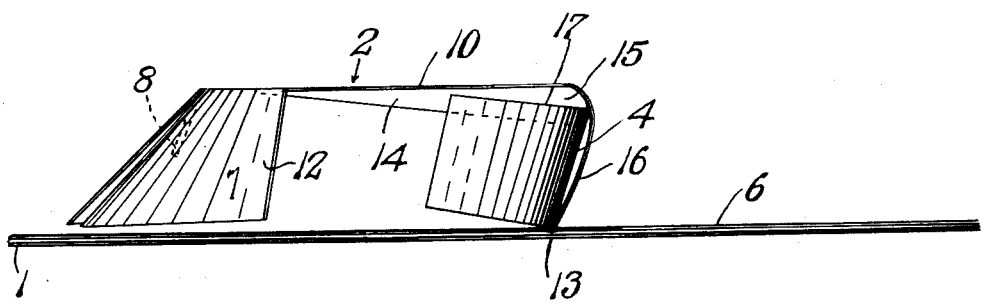
Fig. 3 is a side elevation of my preferred form of collar support as folded for use.
Figure 5:
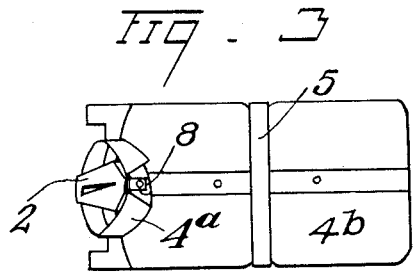
Fig. 5 is a plan view of the obverse side of the folded and supported collar and shirt, reduced.
Figure 4:
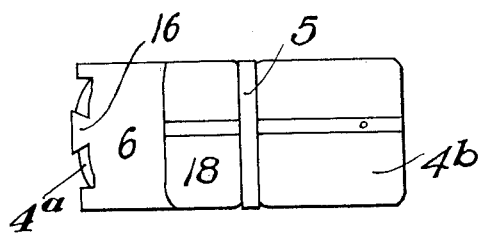
Fig. 4 is a plan view of the reverse side of the folded and supported collar and shirt, reduced.

In the center of the securing arm 10, as shown in Fig. 2, will be noted a triangularly shaped brace 14 having a score 13 indicated on the left side of the figure and by bending this part upon the said score and downward, as shown partly dotted in Fig. 3, a strengthening piece is provided for the securing arm, and its lower and broader end 15 obviously will be positioned within the collar back and form a brace for the collar to prevent the front and back from approaching each other under pressure against the collar front as above mentioned.

By again referring to Fig. 2 it will be noted that a connecting piece 16 connects the securing arm with the bosom board, and this piece stands in a generally erect position, as shown in Fig. 3, and this connecting piece must of necessity be positioned on the outside of the collar where, with the brace on the inside of the collar it will positively maintain the back of the collar erect and at a specified distance from the collar front thereby acting to further secure the collar.

To prevent crushing the collar back a collar back support 4 is provided which may consist of two oppositely positioned pieces, as shown in Fig. 2, separated by the connecting piece 16, or of a single piece as shown in Fig. 1. In either event this collar back support will, when bent upward on its score, and to engage the collar, have a free upper edge 17 adapted for insertion under the collar and between its folds.

By thus positioning the said back support it again becomes obvious that the support and the collar combine to provide great rigidity to the back of the collar. The single support shown in Fig. 1 engages the collar in a like manner and affords as great a support by its continuity.

It is now plainly evident that to provide a cut-out additional material must be provided, and while the cut-outs 2a will weaken the board slightly and a folder 6 will not add much additional material it then becomes advisable to make the bosom board practically double its length as by so doing the shirt and collar will be amply strengthened and protected.

In use the boards are placed in a press and cut to the desired size and shape.

The cut-out boards are then forwarded to their destination as compactly as plain boards.

The boards now are given into the hands of the shirt folder, and as the board is the right dimensions to provide a form, the shirt is laid on its face and smoothed out, the bosom board 1 is next placed thereon and the shirt 4b folded over it.

The folder board 6 is now brought over the back of the shirt and its in-folded tail 18 when a band 5 or folder is utilized to tie the shirt onto the board.

It is now evident that with the collar secured to the board by the collar supports that there can be no lateral or longitudinal movement of the shirt and hence the shirt, and its collar, will remain in its finished state practically indefinitely.

Having thus described my invention, I claim

1. In a collar support, a bosom board, a collar support secured to said bosom board and shaped to provide separate front and rear supports adapted to fit the curvature of the collar, said front support providing a securing means for said collar, and utilizing the securing means as a brace for said support.

2. In a collar support, a bosom board, a collar back support formed integral with said board, a separate collar front support formed integral with said board, and cooperable with the back support to support and secure said collar against said board.

3. In a collar support, comprising a bosom board, a collar support formed integral with said board and providing a back support and stiffener, and a front support, and means to strengthen said supports.

4. In a collar support, an extended bosom board, a collar support formed integral with said board and the extension and disposed to provide back and side supports for said collar, and a cooperable separate member disposed to secure the rear of said collar against said board and provide a front support therefore.

JOHN G. BRITTAIN.